(12) United States Patent
Mai et al.

(10) Patent No.: US 11,120,317 B2
(45) Date of Patent: *Sep. 14, 2021

(54) GRAPHIC IDENTIFICATION CODE GENERATION METHOD AND APPARATUS

(71) Applicant: TENCENT TECHNOLOGY (SHENZHEN) COMPANY LIMITED, Guangdong (CN)

(72) Inventors: Jin Kai Mai, Shenzhen (CN); Rui Bang He, Shenzhen (CN); Yun Feng Dai, Shenzhen (CN); Han Jie Wu, Shenzhen (CN); Fang Ning Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,720

(22) Filed: Apr. 22, 2019

(65) Prior Publication Data

US 2019/0244068 A1 Aug. 8, 2019

Related U.S. Application Data

(63) Continuation of application No. 16/026,187, filed as application No. PCT/SN2017/095569 on Aug. 2, 2017, now Pat. No. 10,311,348.

(30) Foreign Application Priority Data

Aug. 31, 2016 (CN) .......................... 201610799548.6

(51) Int. Cl.
*G06K 19/06* (2006.01)

(52) U.S. Cl.
CPC ... *G06K 19/06037* (2013.01); *G06K 19/0614* (2013.01); *G06K 2019/06225* (2013.01)

(58) Field of Classification Search
CPC ......... G06K 19/06037; G06K 19/0614; G06K 2019/06225
See application file for complete search history.

(56) References Cited

U.S. PATENT DOCUMENTS 8,666,817 B2  3/2014  DeRoller et al.
8,821,277 B2 * 9/2014  Boudville ............... A63F 13/65
                                                     463/31
(Continued)

FOREIGN PATENT DOCUMENTS

CN    103235965 A        8/2013
CN    103763178 A  *    4/2014    ....... G06K 19/06037
(Continued)

OTHER PUBLICATIONS

International Search Report of PCT/CN2017/095569 dated Oct. 24, 2017.
(Continued)

*Primary Examiner* — Sonji N Johnson
(74) *Attorney, Agent, or Firm* — Sughrue Mion, PLLC

(57) ABSTRACT

A method, apparatus, and computer readable medium are provided. The method includes receiving, from a terminal, target information to be coded in a graphic identification code, and personalized effect information. First lattice data is generated according to the target information. Each data point in the first lattice data is processed according to first-type effect information included in the personalized effect information, to obtain second lattice data. The second lattice data is processed according to second-type effect information included in the personalized effect information, to obtain the graphic identification code.

15 Claims, 13 Drawing Sheets

(56) References Cited

U.S. PATENT DOCUMENTS

| | | | | |
|---|---|---|---|---|
| 9,390,358 B1* | 7/2016 | Cheung | ............ | G06K 19/06103 |
| 2013/0020393 A1* | 1/2013 | Hwang | ............ | G06K 19/06112 |
| | | | | 235/462.11 |
| 2013/0021364 A1* | 1/2013 | Azuma | ............ | G06K 19/06103 |
| | | | | 345/589 |
| 2013/0093773 A1* | 4/2013 | DeRoller | ........... | G06Q 30/0251 |
| | | | | 345/467 |
| 2014/0120886 A1 | 5/2014 | Xu | | |
| 2014/0326793 A1 | 11/2014 | Windmueller et al. | | |
| 2016/0078336 A1* | 3/2016 | Ari | ................... | G06K 19/06112 |
| | | | | 235/494 |
| 2016/0164991 A1* | 6/2016 | Zheng | .................... | H04L 67/26 |
| | | | | 709/219 |

FOREIGN PATENT DOCUMENTS

| | | | |
|---|---|---|---|
| CN | 103763178 | A | 4/2014 |
| CN | 103854298 | A | 6/2014 |
| CN | 103886353 | A | 6/2014 |
| CN | 106709543 | A | 5/2017 |
| WO | 2010/039021 | A2 | 4/2010 |

OTHER PUBLICATIONS

CSDN article from the internet, URL: https://blog.csdn.net/u012210186/article/details/50739480, 21 pages total.

Communication dated Dec. 19, 2018 issued by the State Intellectual Property Office of People's Republic of China in counterpart application No. 201610799548.6.

Communication dated Apr. 29, 2020, from the European Patent Office in application No. 17845133.2.

* cited by examiner

FIG. 2B

| Upper left | Upper right | | | |
|---|---|---|---|---|
| Lower left | Lower right | | | |
| | | | | |
| | | | | |
| | | | | |

FIG. 2C

GRAPHIC IDENTIFICATION CODE GENERATION METHOD AND APPARATUS

CROSS-REFERENCE TO RELATED APPLICATIONS

This application is a continuation of U.S. application Ser. No. 16/026,187, filed on Jul. 3, 2018 in the United States Patent and Trademark Office, which is a continuation of International Patent Application No. PCT/CN2017/095569 filed on Aug. 2, 2017, which claims priority from Chinese Patent Application No. 201610799548.6, filed with the Chinese Patent Office on Aug. 31, 2016, the disclosures of each of which are incorporated by reference herein in their entirety.

BACKGROUND

1. Field

This application relates to the field of electronic tags, and in particular, to a graphic identification code generation method and apparatus.

2. Description of Related Art

In recent years, electronic tag technologies are rapidly developing, and are widely applied to various fields of construction of digital cities. Currently, most well-known electronic tags are graphic identification codes such as two-dimensional codes. The two-dimensional code is also referred to as a two-dimensional barcode, and is an image that includes at least two colors and that is formed by distributing specific geometric figures on a plane (two-dimensional direction) according to a specific rule. Because a graphic identification code has a large information storage amount and is not vulnerable to outside impact, the accuracy is relatively high. Therefore, people are more inclined to transfer information by generating and using a graphic identification code as a carrier.

In the related art technology, it is possible to automatically generate a relatively simple graphic identification code by using graphic identification code generation software. However, the efficiency for generating the graphic identification code is poor, resulting in limited use scenarios of the graphic identification code, a relatively small audience range, and little flexibility.

SUMMARY

It is an aspect to provide a graphic identification code generation method and apparatus that address the above problems with the related art technology.

According to an aspect of one or more embodiments, there is provided a method. The method includes receiving, from a terminal, target information to be coded in a graphic identification code, and personalized effect information. First lattice data is generated according to the target information. Each data point in the first lattice data is processed according to first-type effect information included in the personalized effect information, to obtain second lattice data. The second lattice data is processed according to second-type effect information included in the personalized effect information, to obtain the graphic identification code.

According to other aspects of one or more exemplary embodiment, there is also provided an apparatus and computer readable medium consistent with the method.

BRIEF DESCRIPTION OF THE DRAWINGS

Embodiments will be described below with reference to the accompanying drawings in which:

FIG. 2B is a schematic diagram of a data lattice according to an embodiment of this application;

FIG. 2C is a schematic diagram of a data lattice according to an embodiment of this application;

DETAILED DESCRIPTION

To make the objectives, technical solutions, and advantages of this application clearer, the following further describes the implementations of this application in detail with reference to the accompanying drawings.

In the related art technology, a terminal may automatically generate a relatively simple graphic identification code by using graphic identification code generation software. Further, to satisfy good-looking and personalized requirements of the graphic identification code, designers nowadays add many interesting elements to the graphic identification code, for example, make graphic identification codes having personalized effects such as rounded corners, a liquefaction effect, and a three-dimensional effect.

Because the graphic identification codes having personalized effects such as rounded corners, the liquefaction effect, and in the related art, the three-dimensional effects need to be manually made by designers, the efficiency for generating the graphic identification code is greatly reduced, resulting in limited use scenarios of the graphic identification code, a relatively small audience range, and low flexibility.

Before the embodiments of this application are explained and described in detail, the architecture of a graphic identification code generation system in the embodiments of the disclosure are first briefly described.

Figure 1:
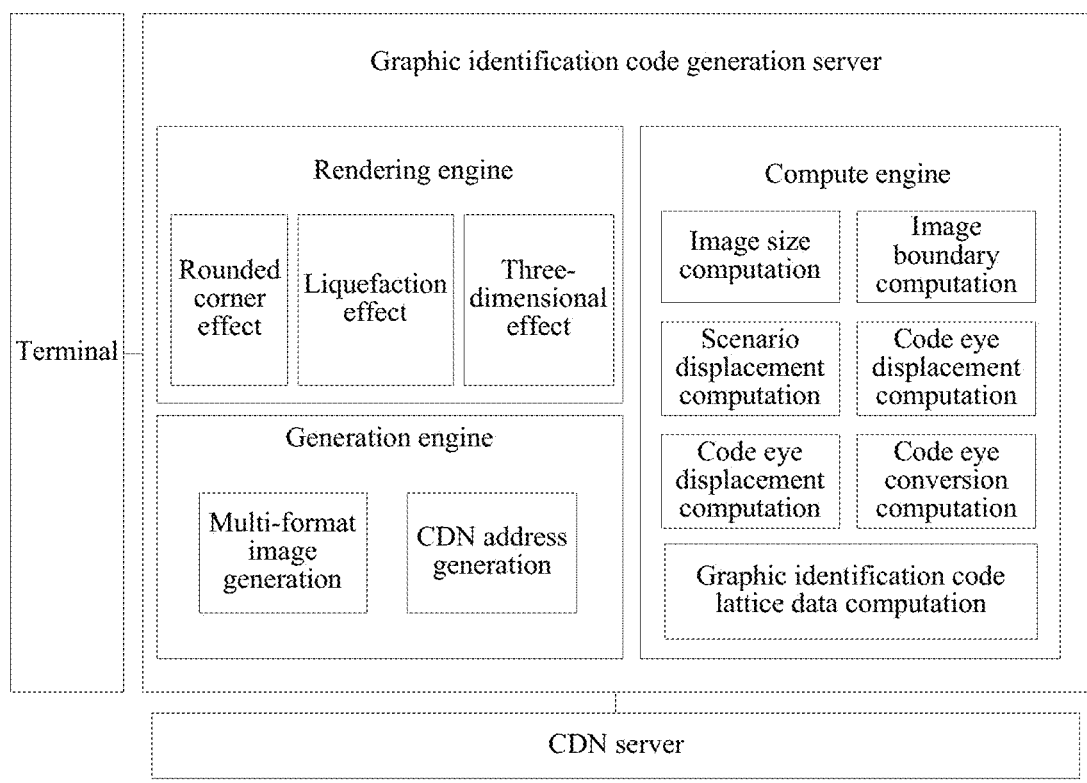
FIG. 1 is an architectural diagram of a graphic identification code generation system according to an embodiment of this application.

Referring to FIG. 1, the architecture of the graphic identification code generation system includes a terminal, a graphic identification code generation server, and a content delivery network (CDN) server. The graphic identification code generation server includes a compute engine, a rendering engine, and a generation engine.

The terminal is configured to send target information and personalized effect information of a to-be-generated graphic identification code to the graphic identification code generation server. The target information indicates information displayed after the graphic identification code is scanned, and the personalized effect information indicates a display effect of the graphic identification code. After receiving the target information and the personalized effect information, the graphic identification code generation server generates lattice data of the graphic identification code according to the target information, and generates the graphic identification code having a personalized effect according to the lattice data and the personalized effect information.

The compute engine is configured to compute the lattice data, image size, boundary size, scenario displacement, code eye displacement, logo displacement, and the like according to the target information and the personalized effect information that are input by the terminal. The image size is used to indicate lengths of sides of the generated graphic identification code; the boundary size is used to indicate the size of a boundary box when the boundary box is added for the graphic identification code; the scenario displacement is used indicate an embedded location of the graphic identification code in a scenario image when a scenario is added for the graphic identification code; the code eye displacement is used to indicate an embedded location of a code eye image in the graphic identification code; and the logo displacement is used to indicate an embedded location of a logo image in the graphic identification code.

The rendering engine is configured to draw advanced effects such as a rounded corner effect, a liquefaction effect, and a three-dimensional effect of each data point in a data lattice of the graphic identification code by using a "rounded corner effect algorithm", a "liquefaction effect algorithm", and a "three-dimensional effect algorithm". In addition, the rendering engine may further load a code eye image, perform X axis and Y axis reverse conversion on the code eye image, and then draw a personalized code eye effect at a vertex angle location of the data lattice. Alternatively, the rendering engine may further load a logo, and draw a personalized logo effect and the like on the data lattice of the graphic identification code.

The generation engine may support to generate graphic identification codes in various formats. Then, the generation engine uploads the graphic identification code to the CDN server, and the CDN server stores the graphic identification code. Afterwards, the generation engine further generates a CDN address for the graphic identification code, and returns the CDN address to the terminal. After receiving the CDN address, the terminal may download the graphic identification code from the CDN server according to the CDN address.

Figure 2A:
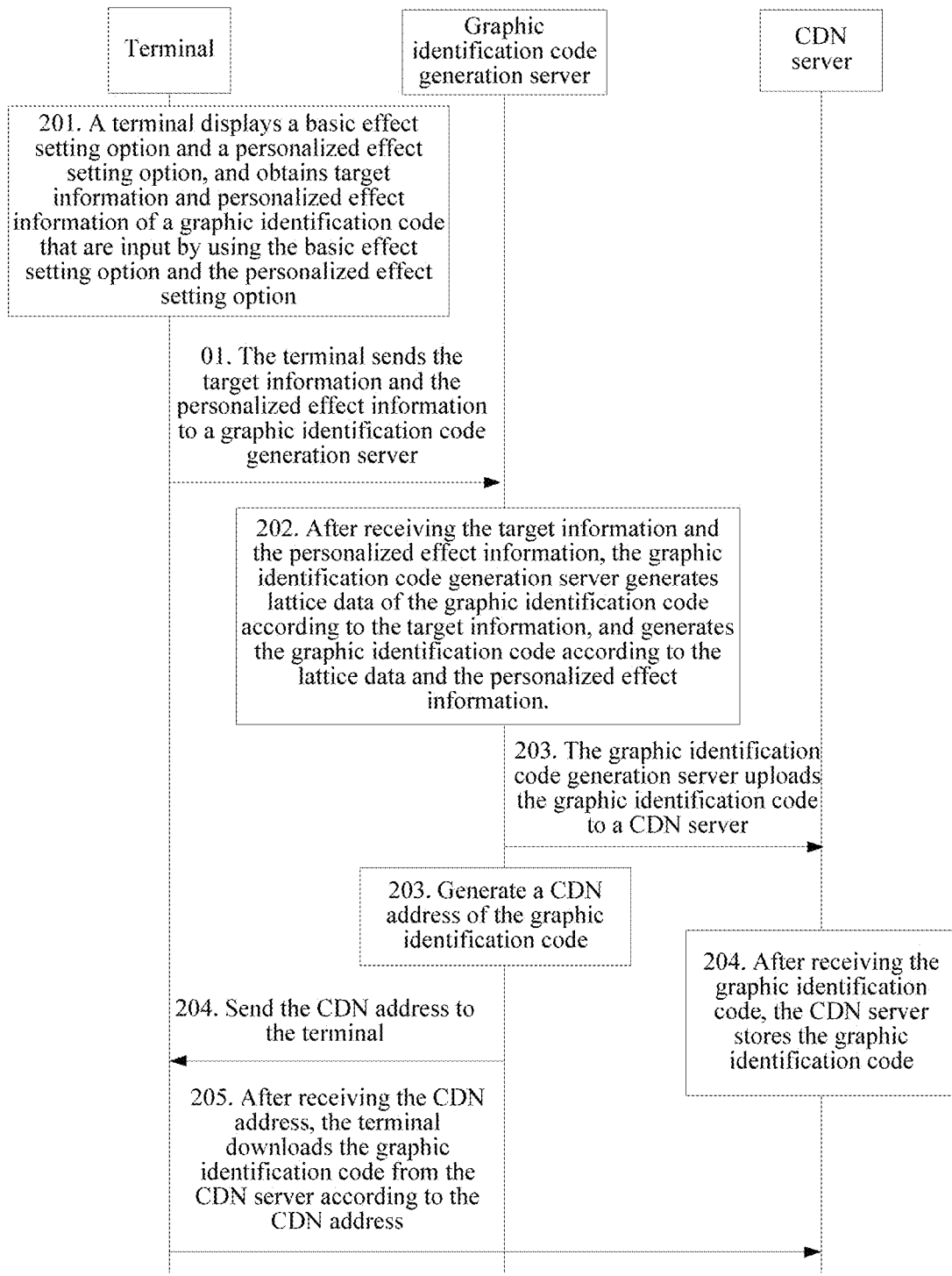
FIG. 2A is a flowchart of a graphic identification code generation method according to an embodiment of this application.

FIG. 2A is a flowchart of a graphic identification code generation method according to an embodiment of this application. Referring to FIG. 2A, the method includes the following steps:

201. A terminal displays a basic effect setting option and a personalized effect setting option, obtains target information and personalized effect information of a graphic identification code that are input by using the basic effect setting option and the personalized effect setting option, and sends the target information and the personalized effect information to a graphic identification code generation server.

In this embodiment of this application, the graphic identification code generation method in this specification is actually a function provided in a terminal management application installed on the terminal. This is not specifically limited in this embodiment of this application. For example, a main interface of the terminal management application is configured with a graphic identification code generation option, and after the graphic identification code generation option is clicked, menu pages including the target information setting option and the personalized effect setting option are displayed. The target information setting option is used to support a user to input the target information. The target information is information displayed after the graphic identification code is scanned. For example, the user can select at least one of a text, an image, and a link as the target information. This is not specifically limited in this embodiment of this application.

The personalized effect information setting option may include a drop-down list. The drop-down list includes an advanced effect setting sub-option and a general effect setting sub-option. The advanced effect includes a rounded corner effect, a liquefaction effect, a three-dimensional effect, and the like. The general effect includes code eye addition, logo addition, size setting, format setting, boundary setting, scenario setting, and the like. In this embodiment of this application, types of the target information and the personalized effect information are not specifically limited. Similarly, manners of obtaining the target information and the personalized effect information are also not limited in this embodiment of this application.

202. After receiving the target information and the personalized effect information, the graphic identification code generation server generates lattice data of the graphic identification code according to the target information, and generates the graphic identification code according to the lattice data and the personalized effect information.

In this embodiment of this application, after the target information is received, the type of the target information is identified, and the target information may be converted into the lattice data by using different algorithms for different types of the target information. Regardless of the algorithm, the finally generated lattice data is a bit stream, and a value of each bit in the bit stream is 0 or 1.

The generating the graphic identification code according to the obtained lattice data and the personalized effect information may be implemented in the following manner:

202a. Generate a first data lattice according to the lattice data.

In this embodiment of this application, the first data lattice includes a plurality of data points. A value of each data point in the first data lattice corresponds to a value of the lattice data. FIG. 2B shows a 4×4 two-dimensional array. Using an example in which the two-dimensional array indicates the first data lattice, the original lattice data is a bit stream "1010110000110101". In the first data lattice, a value of a data point A[0][0] is 1, and a value of a data point A[0][1] is 0. The rest can be deduced by analogy. A value of a data point A[0][3] is 0. The values of the data points correspond to values of bits in the lattice data. 1 indicates filling a foreground color, and 0 indicates filling a background color.

For example, the foreground color may be black, and the background color may be white. In this embodiment of this application, the quantity of data points in the first data lattice, a value setting manner, and colors of the foreground color and the background color are not specifically limited.

202b. Determine a drawing algorithm matched with first-type effect information in the personalized effect information.

It should be noted that, the first-type effect information in this embodiment of this application indicates advanced effect information such as liquefaction effect information, three-dimensional effect information, and rounded corner effect information. A liquefaction effect, a three-dimensional effect, and a rounded corner effect correspond to different drawing algorithms. When the graphic identification code having the personalized effect information is generated, drawing further is to be performed by obtaining a corresponding drawing algorithm according to the received advanced effect information.

202c. Invoke the drawing algorithm for each data point in the first data lattice, and perform color filling on the data point according to a value of the data point, to obtain a second data lattice.

For the liquefaction effect, performing color filling on each data point according to the value of each data point by invoking the liquefaction effect drawing algorithm may be specifically divided into the following steps:

Step 1. for a data point, divide the data point into a preset quantity of squares having a same size.

The preset quantity may be four, eight, or the like. A value of the preset quantity is not specifically limited in this embodiment of this application. As shown in FIG. 2C, a data point may be divided into upper left, upper right, lower left, and lower right squares having a same size. In this embodiment of this application, a manner of dividing a data point is not specifically limited.

Step 2. Perform, according to the value of the data point, color filling on each square obtained through division.

For step 2, using an example in which the foreground color is black, the background color is white, 1 indicates filling the foreground color, and 0 indicates filling the background color, the performing color filling on each square may be implemented by using the following rule:

(a) When the value of the data point is a first value, if all values of other data points connected to the current to-be-filled square are a second value, the current to-be-filled square is filled with the background color.

Figure 2D:
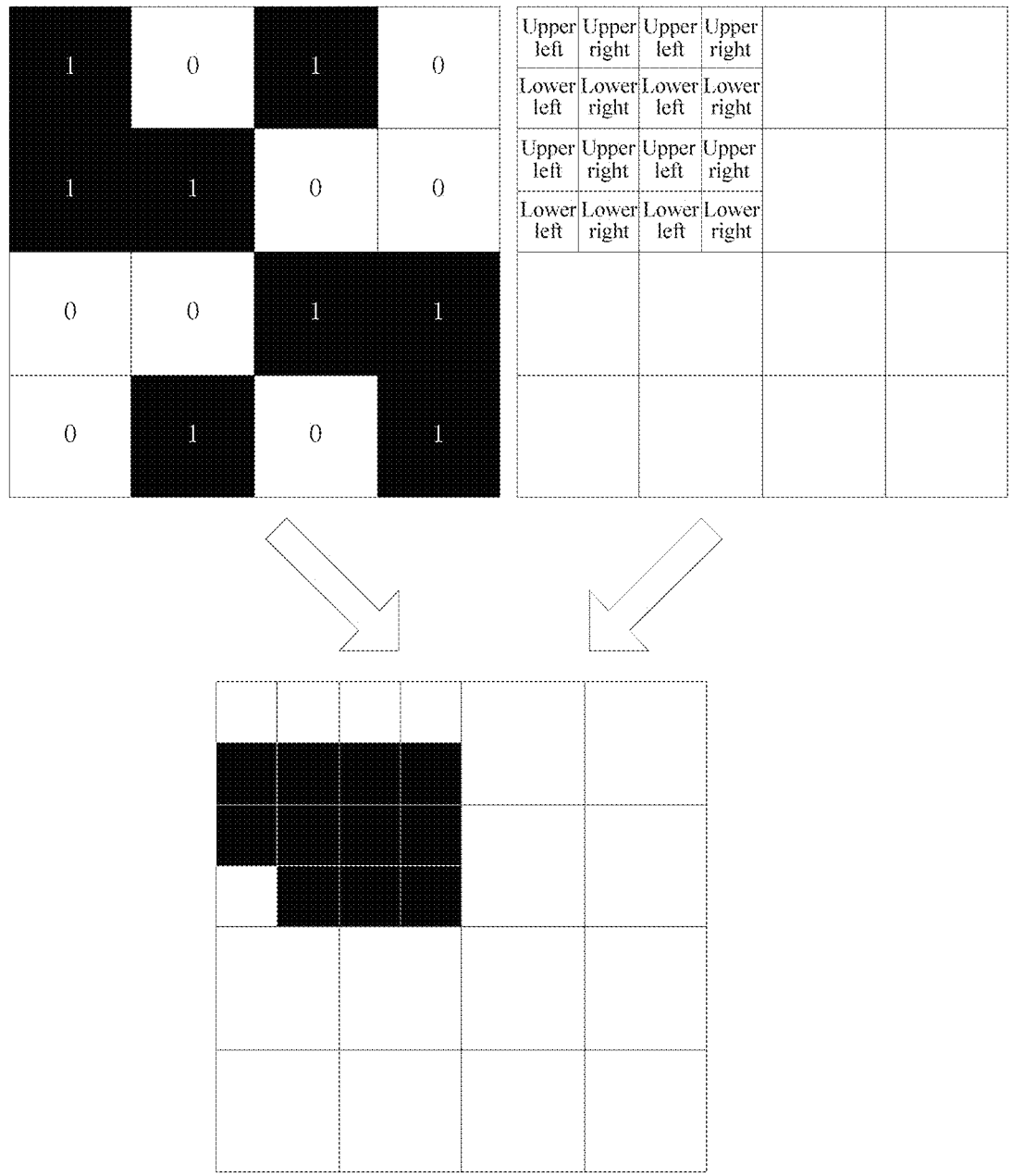
FIG. 2D is a schematic diagram of a liquefaction process according to an embodiment of this application.

The first value indicates 1, and the second value indicates 0. Using an example in which data points A[0][0], A[0][1], A[1][0], and A[1][1] are filled, filling processes and filling results are shown in FIG. 2D. Using the divided data point A[0][0] as an example, for an upper right square, the right side of the square is connected to a data point whose value is 0, that is, connected to a data point filled with white. Therefore, the upper right square is filled with the background color, that is, white. If a contact point exists between any data point and the square, the data point is connected to the square. As shown in FIG. 2D, a lower right square of the data point A[0][0] is connected to the data points A[0][1], A[1][0], and A[1][1].

(b) When the value of the data point is the first value, if the current to-be-filled square is not connected to other data points, the current to-be-filled square is filled with the background color.

As shown in FIG. 2D, using the divided data point A[0][0] as an example, for an upper left square, four sides of the square are not connected to any data point. Therefore, the upper left square is filled with the background color, that is, white.

It should be noted that, in addition to the foregoing two cases (a) and (b), the current to-be-filled square is filled with the foreground color, that is, black. For example, for a lower left square, the lower side of the square is connected to a data point whose value is 1, that is, a data point filled with black. Therefore, the lower left square is filled with the foreground color, that is, black. For a lower right square, the lower side of the square is connected to a data point whose value is 1, and the right side is connected to a data point whose value is 0, so that a requirement that at least a value of a data point connected to the to-be-filled square is 1 is satisfied. Therefore, the lower right square is filled with the foreground color.

(c) When the value of the data point is the second value, if all values of other data points adjacent to the current to-be-filled square are the first value, the current to-be-filled square is filled with the foreground color.

For this case, color filling is performed on four to-be-filled squares according to the values of the other data points adjacent to the four to-be-filled squares. If any side of any data point and any side of the to-be-filled square overlap, the data point is adjacent to the to-be-filled square.

As shown in FIG. 2D, using the divided data point A[0][1] as an example, a value of the data point A[0][1] is 0 and is filled with white. For a lower left square, the left side and the lower side of the square separately overlap any side of a data point whose value is 1, that is, the square is adjacent to the data point. Therefore, the square is filled with the foreground color, that is, black. For a lower right square, the right side and the lower side of the square separately overlap any side of a data point whose value is 1, that is, the square is adjacent to the data point. Therefore, the square is filled with the foreground color, that is, black.

If squares adjacent to the current to-be-filled square are not all black, the current to-be-filled square is filled with the background color, that is, white. For example, for an upper left square of the divided data point A[0][1], the left side of the square and the right side of a data point whose value is 1 overlap, that is, the square is adjacent to the data point. However, there is no black-filled square above the square. Therefore, the square is filled with the background color, that is, white. For an upper right square of the data point A[0][1], the right side of the square and the left side of a data point whose value is 1 overlap, that is, the square is adjacent to the data point, but there is no black-filled square above the square. Therefore, the square is filled with the background color, that is, white.

It should be noted that the foreground color and the background color may be indicated by an identifier of the foreground color and an identifier of the background color in the personalized effect information.

Step 3. Superpose a rounded corner square filled with a color on the data point.

Figure 2E:
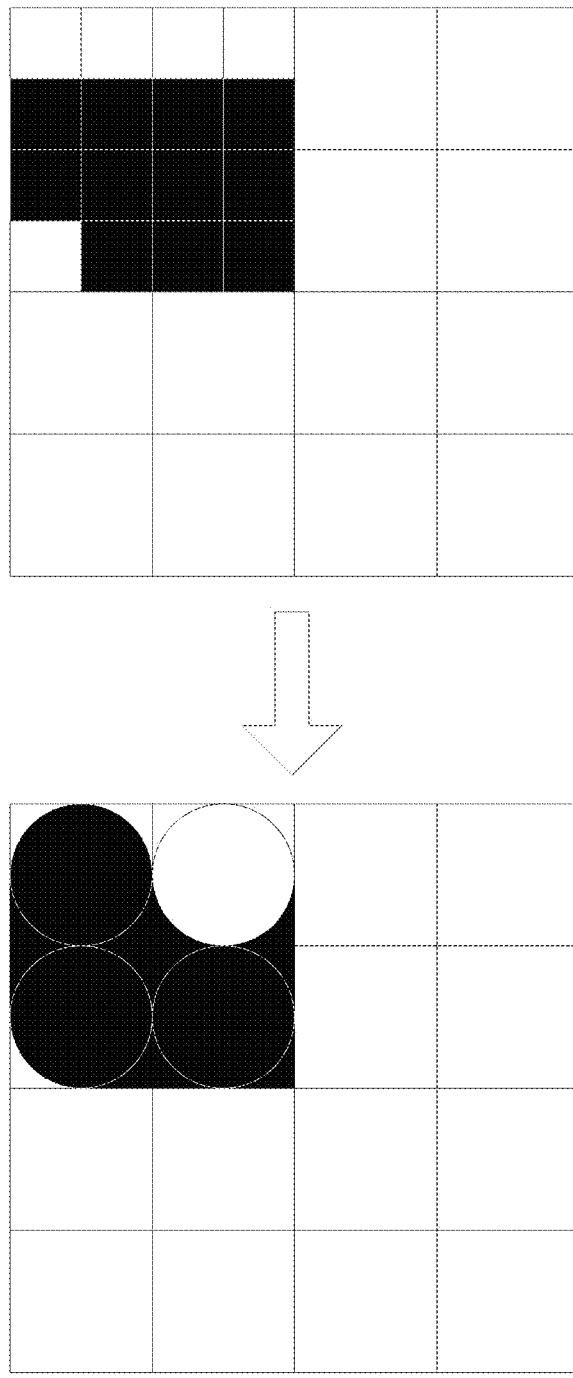
FIG. 2E is a schematic diagram of a liquefaction process according to an embodiment of this application.
Figure 2F:
FIG. 2F is a diagram of a liquefaction effect according to an embodiment of this application.

The length of the side of the rounded corner square is the same as the length of the side of the data point, and the filled color of the rounded corner square matches the value of the data point. For a data point, after four squares obtained through division are filled, a rounded corner square filled with a color further is to be superposed on the data point. Using the data point A[0][0] as an example, if the value of the data point is 1, that is, the filled color is the foreground color, a rounded corner square filled with the foreground color is superposed on the data point A[0][0]. Afterwards, A[0][1], A[1][0], and A[1][1] may be filled with colors in sequence. When the radian of the rounded corner is the maximum, the rounded corner square is a circular. Using a circular as an example, a filling effect shown in FIG. 2E can be obtained. After completing the foregoing liquefaction effect drawing operation on each data point in the first data lattice, a liquefaction effect diagram shown in FIG. 2F can be obtained.

For the three-dimensional effect, performing color filling on each data point according to the value of each data point by invoking the three-dimensional effect drawing algorithm may be specifically divided into the following steps:

Step 1: For a data point, determine whether the data point is to be filled with the background color according to the value of the data point; and if the data point is to be filled with the background color, fill the data point with the background color.

Figure 2G:
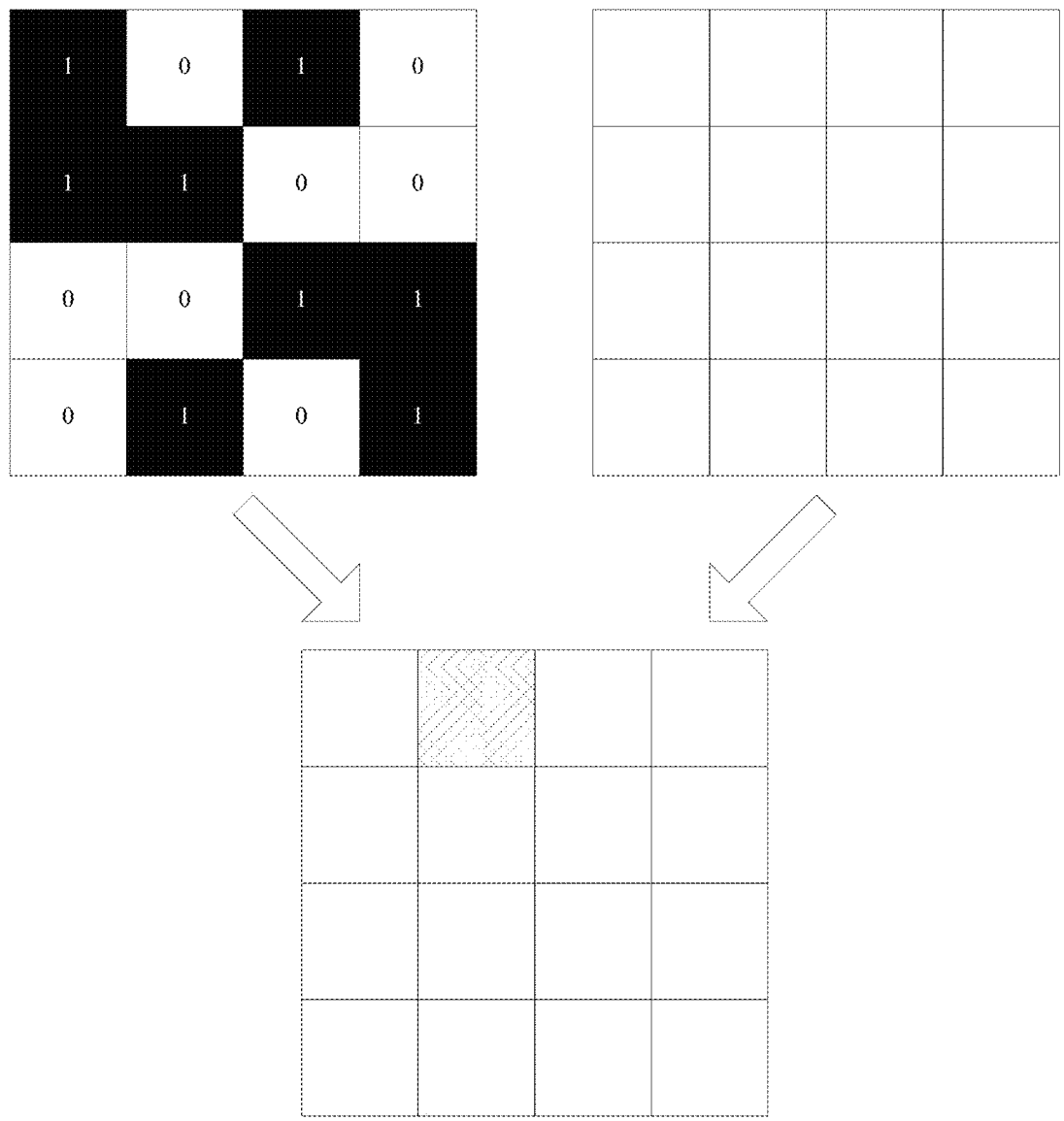
FIG. 2G is a schematic diagram of a three-dimensional process according to an embodiment of this application.

For the step, if the value of the data point is the second value, the background color is to be filled; or if the value of the data point is the first value, the background color is not to be filled. Using 4×4 lattice data as an example, a process of filling the background color is shown in FIG. 2G. Using an example in which data points A[0][0], A[0][1], A[1][0], and A[1][1] are filled, in FIG. 2G, because the value of the data point A[0][1] is 0, the background color is to be filled. However, because values of the data points A[0][0], A[1][0], and A[1][1] are 1, they do not need to be filled with the background color.

Step 2. Draw at least one parallelogram based on the outline of the data point, and perform color filling on each drawn parallelogram according to the value of the data point.

For a data lattice, parallelograms need to be drawn based on outlines of data points in the data lattice according to a particular sequence, for example, a sequence from the left to the right, a sequence from the top to the bottom, or a head-to-end connected sequence. This is not specifically limited in this embodiment of this application. When the parallelograms are drawn according to a particular sequence, because overlapped sides exist between data points, several parallelograms may need to be drawn for some data points, and only one parallelogram may need to be drawn for other data points.

For step 2, the performing color filling on each drawn parallelogram according to the value of the data point may be implemented by using the following rule:

(a) When the value of the data point is a first value, if all values of other data points adjacent to the current to-be-filled parallelogram are a second value, the current to-be-filled parallelogram is filled with another color other than the foreground color and the background color.

Figure 2H:
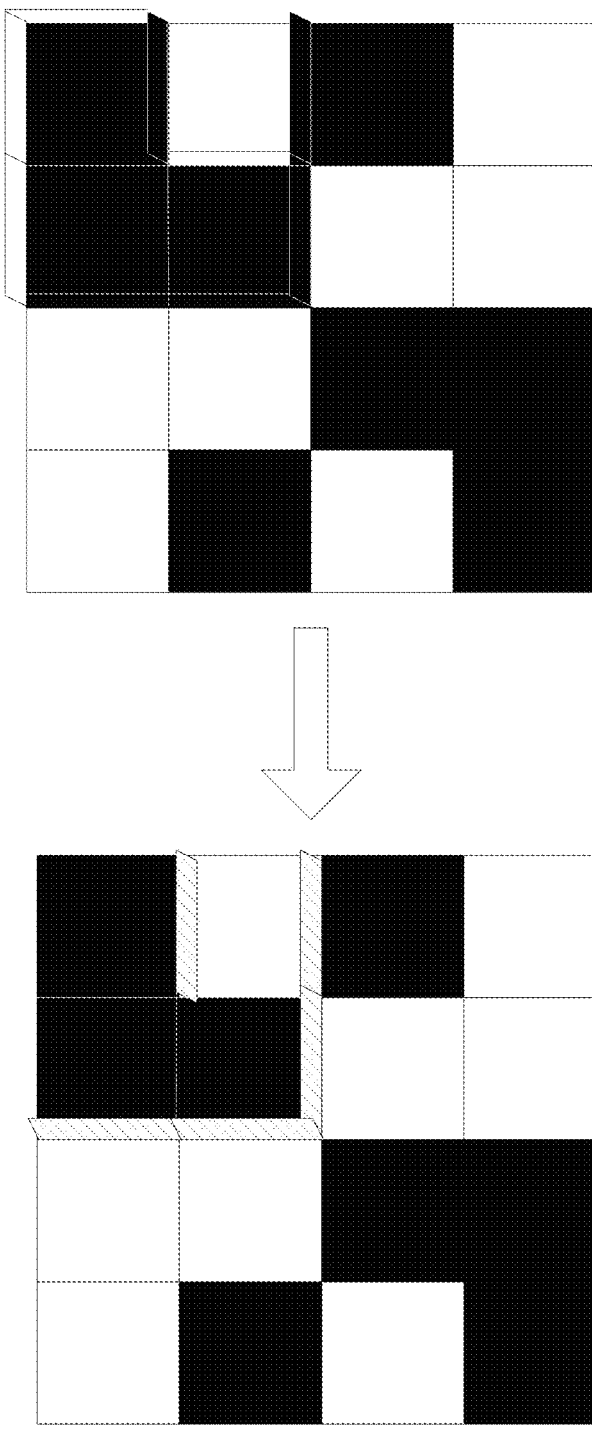
FIG. 2H is a schematic diagram of a three-dimensional process according to an embodiment of this application.

As shown in the upper figure in FIG. 2H, still using the four data points A[0][0], A[0][1], A[1][0], and A[1][1] mentioned in FIG. 2G as an example, for the data point A[0][0], the value of the data point is 1, and the value of the data point A[0][1] adjacent to the right side is 0, so that the parallelogram on the right of the data point A[0][0] is filled with another color other than the foreground color and the background color. The another color is different from the background color and the foreground color, and is generally grey. This is not specifically limited in this embodiment of this application.

(b) When the value of the data point is the first value, if the current to-be-filled parallelogram is not adjacent to other data points, the current to-be-filled parallelogram is filled with the another color.

As shown in the upper figure in FIG. 2H, for the data point A[0][0], there is no data point adjacent to the upper side of the data point, so that the parallelogram on the upper side of the data point A[0][0] is filled with the another color other than the foreground color and the background color.

(c) When the value of the data point is the second value, if all the values of the other data points adjacent to the current to-be-filled parallelogram are the second value, the current to-be-filled parallelogram is filled with the another color.

As shown in the upper figure in FIG. 2H, for the data point A[0][1], there is no data point adjacent to the upper side of the data point, so that the parallelogram on the upper side of the data point A[0][1] is filled with the another color other than the foreground color and the background color.

Step 3. Determine whether the data point is to be filled with the foreground color according to the value of the data point; and if the data point is to be filled with the foreground color, fill the data point with the foreground color.

Figure 2I:
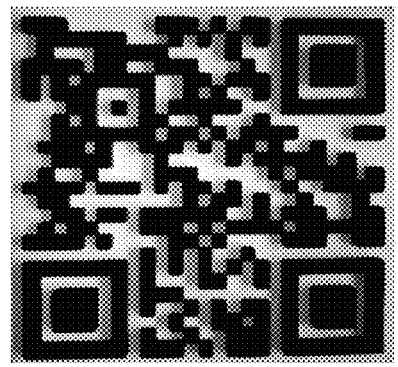
FIG. 2I is a diagram of a three-dimensional effect according to an embodiment of this application.

Still using the upper figure in FIG. 2H as an example, if a value of a data point is 1, the data point is to be filled with the foreground color, and if the value is 0, the data point is not to be filled with the foreground color. For example, the data points A[0][0], A[1][0], A[1][1] do not need to be filled with the foreground color, the four filled data points are shown in the lower figure in FIG. 2H. After completing the foregoing three-dimensional effect drawing operation on each data point in the first data lattice, a three-dimensional effect diagram shown in FIG. 2I can be obtained.

For the rounded corner effect, performing color filling on each data point according to the value of each data point by invoking the rounded corner effect drawing algorithm may be specifically divided into the following steps:

Step 1. For a data point, change the shape of the data point from a square to a circular.

For each data point in the first data lattice, the square-shaped data point is replaced with a circular whose diameter is the same as the length of the side of the square, to obtain a replaced first data lattice.

Step 2. When the value of the data point is the first value, fill the circular-shaped data point with the foreground color.

When the value of the data point is the first value, that is, 1, the circular-shaped data point is filled with the foreground color.

Step 3. When the value of the data point is the second value, fill the circular-shaped data point with the background color.

Figure 2J:
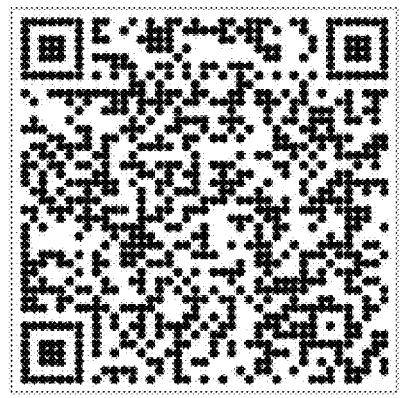
FIG. 2J is a diagram of a rounded corner effect according to an embodiment of this application.

When the value of the data point is 0, the circular-shaped data point is filled with the background color. After completing the foregoing rounded corner effect drawing operation on each data point in the replaced first data lattice, a rounded corner effect diagram shown in FIG. 2J can be obtained.

It should be noted that for different terminal users, based on preferences of different users, personalized effects selected by the users during graphic identification code generation are different. Therefore, when a graphic identification code is generated, a part of the foregoing liquefaction effect, the three-dimensional effect, or the rounded corner effect may be used, or none of the foregoing advanced effects may be used. This is not specifically limited in this embodiment of this application, and the graphic identification code is directly generated according to the received personalized effect information. In addition, besides the foregoing advanced effects, this embodiment of this application also supports effects such as adding a code eye, a logo, or a scenario to the graphic identification code. In this embodiment of this application, those effects are generally referred to as second-type effect information. That is, the second-type effect information indicates other effect information other than the foregoing advanced effect information such as the liquefaction effect information, the three-dimensional effect information, and the rounded corner effect information.

202d. Process the obtained second data lattice according to second-type effect information in the personalized effect information, to obtain the graphic identification code.

Using code eye addition as an example, the processing the obtained second data lattice is as follows:

Step 1. Determine a code eye type indicated by code eye information included in the personalized effect information.

The code eye type may include a square, a rounded corner, and the like. This is not specifically limited in this embodiment of this application.

Step 2. Obtain a code eye image and first location information that match the code eye type.

The first location information indicates a code eye displacement, the corresponding code eye image is added to the first data lattice according to code eye displacement. For example, a rectangular coordinate system is established by using the upper left corner of the first data lattice as the origin of the coordinates, the code eye displacement indicates a distance between a code eye addition location and the origin of the coordinates, and the code eye displacement can be obtained according to the code eye information. If the code eye displacement is 1, the code eye image is added at a location that is 1 unit length away from the origin of the coordinates. In the first data lattice, at least one code eye image may be added, and at most four code eye images may be added. The quantity of added code eye images is not specifically limited in this embodiment of this application. The code eye image generally does not need to be provided by the user, several types of code eye images are preset in the graphic identification code generation server for the user to select.

Step 3. Perform horizontally flipping, vertically flipping, and diagonally flipping on the code eye image if the code eye image is a non-axially symmetric image, to obtain a first flipped image, a second flipped image, and a third flipped image.

For example, when the code eye image is rounded corner-shaped, if four code eye images need to be added to the first data lattice, and locations for adding the code eye images are separately the upper left corner, the upper right corner, the lower left corner, and the lower right corner, the code eye image is to be horizontally flipped by using the y axis as a symmetry axis, to obtain the first flipped image; the code eye image is to be vertically flipped by using the x axis as a symmetry axis, to obtain the second flipped image, and the code eye image is to be diagonally flipped by using an axis obtained after rotating the x axis 45° in the counter-clockwise direction, to obtain the third flipped image. In this embodiment of this application, the shape of the code eye image is not specifically limited.

Step 4. Perform code eye addition at a vertex angle location indicated by the first location information in the second data lattice based on the code eye image, the first flipped image, the second flipped image, and the third flipped image, to obtain the graphic identification code.

For example, when the code eye image is to be added to the upper left corner, the upper right corner, and the lower left corner, the code eye image, the first flipped image, and the second flipped image are separately added to corresponding locations. For example, when the code eye image is to be added to the upper left corner, the upper right corner, the lower left corner, and the lower right corner, the code eye image, the first flipped image, the second flipped image, and the third flipped image are separately added to corresponding locations.

Figure 2K:
FIG. 2K is a diagram of a code eye effect according to an embodiment of this application.

Using an example in which three code eye images are added, an effect diagram after the three code eye images are added is shown in FIG. 2K. The quantity of added code eye images is not specifically limited in this embodiment of this application.

In addition, besides the code eye effect, another effect may further be added to the graphic identification code, and details are as follows:

Case 1: When the second-type effect information is logo information, a to-be-added logo and second location information are obtained, and the logo is added at a location indicated by the second location information in the second data lattice, to obtain the graphic identification code.

Figure 2L:
FIG. 2L is a diagram of a logo effect according to an embodiment of this application.

The second location information indicates a logo displacement. If a rectangular coordinate system is established by using the upper left corner of the first data lattice as the origin of the coordinates, the logo displacement is generally a distance between the center point of the first data lattice and the origin of the coordinates. As shown in FIG. 2L, FIG. 2L is an effect diagram after the logo is added, in FIG. 2L, a distance between the center point of the first data lattice and the upper left corner is the logo displacement. Generally, the location at which the logo is added is the center location of the image. This is not specifically limited in this embodiment of this application.

Case 2: When the second-type effect information is size information, scaling processing is performed on the second data lattice according to the size information, to obtain the graphic identification code.

For example, when the user sets to generate a 2×2 cm graphic identification code, and a generated second data lattice is 8×8 cm, the second data lattice is further reduced according to a ratio, to reduce the second data lattice to 2×2 cm. Alternatively, for example, when the user sets to generate a 3×3 cm graphic identification code, and a generated second data lattice is 1×1 cm, the second data lattice is enlarged according to a ratio, to enlarge the second data lattice to 3×3 cm.

Case 3: When the second-type effect information is format information, the second data lattice is stored as an image format indicated by the format information, to obtain the graphic identification code.

Alternative formats include, but are not limited to, portable network graphics (PNG), a bitmap (BMP), and a Joint Photographic Experts Group (JPEG). The format type is not specifically limited in this embodiment of this application.

Case 4: When the second-type effect information is boundary information, a boundary box is added for the second data lattice according to boundary information, to obtain the graphic identification code.

The boundary information is size information of the added boundary box. For example, when the boundary information is 1 cm, a 1 cm boundary box is added to the graphic identification code.

Case 5: When the second-type effect information is scenario information, a scenario image and third location information are obtained, and the second data lattice is embedded at a location indicated by the third location information in the scenario image, to obtain the graphic identification code.

Figure 2M:
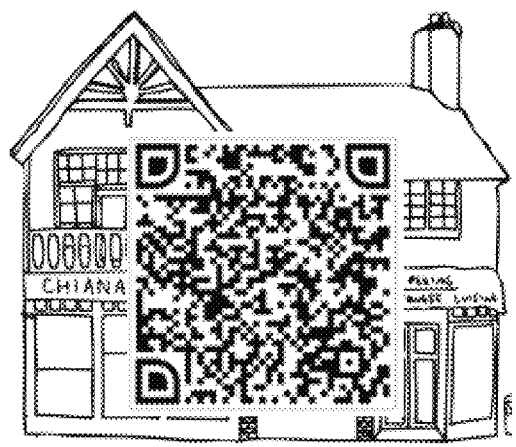
FIG. 2M is a diagram of a scenario effect according to an embodiment of this application.

The third location information indicates a scenario displacement. If a rectangular coordinate system is established by using the upper left corner of the second data lattice as the origin of the coordinates, the scenario displacement is generally a distance between the center point of the scenario image and the origin of the coordinates. As shown in FIG. 2M, FIG. 2M is an effect diagram after a scenario is added. In FIG. 2M, a distance between the center point of a scenario image and the origin of the coordinates is the scenario displacement. It should be noted that the size of the scenario image further is to be greater than the graphic identification code. The scenario image may be provided by the user.

After the graphic identification code is generated according to step 201 and step 202, to return the generated graphic identification code to the terminal, this embodiment of this application further includes the following step 203 to step 205.

203. The graphic identification code generation server uploads the graphic identification code to a CDN server, generates a CDN address of the graphic identification code, and sends the CDN address to the terminal.

The step is completed by a generation engine in the graphic identification code generation server. For example, the generated CDN address may be bmp.kkcdn.net. The type of the CDN address is not specifically limited in this embodiment of this application.

204. After receiving the graphic identification code, the CDN server stores the graphic identification code.

205. After receiving the CDN address, the terminal downloads the graphic identification code from the CDN server according to the CDN address.

In this embodiment of this application, after the terminal obtains the graphic identification code through downloading, the graphic identification code may be applied to scenarios such as contact card identification, code scanning payment, and commodity information display. For example, the target information carried in the graphic identification code is obtained and displayed to the user by scanning and identifying the graphic identification code by using a code scanning device.

According to the method provided in this embodiment of this application, after obtaining the target information and the personalized effect information of the graphic identification code by using the displayed basic effect setting option and the personalized effect setting option, the terminal sends the target information and the personalized effect information to the server, so that after generating the lattice data of the graphic identification code according to the target information, the server may further perform processing on the lattice data according to the personalized effect information, to generate the graphic identification code having the personalized effect such as the rounded corner effect, the liquefaction effect, or the three-dimensional effect. Because the graphic identification code having the personalized effect such as the rounded corner effect, the liquefaction effect, or the three-dimensional effect may be automatically generated without manual making of a designer, the efficiency for generating the graphic identification code is greatly improved, more scenario requirements are satisfied, an audience range is relatively large, and the flexibility is relatively high.

Figure 3:
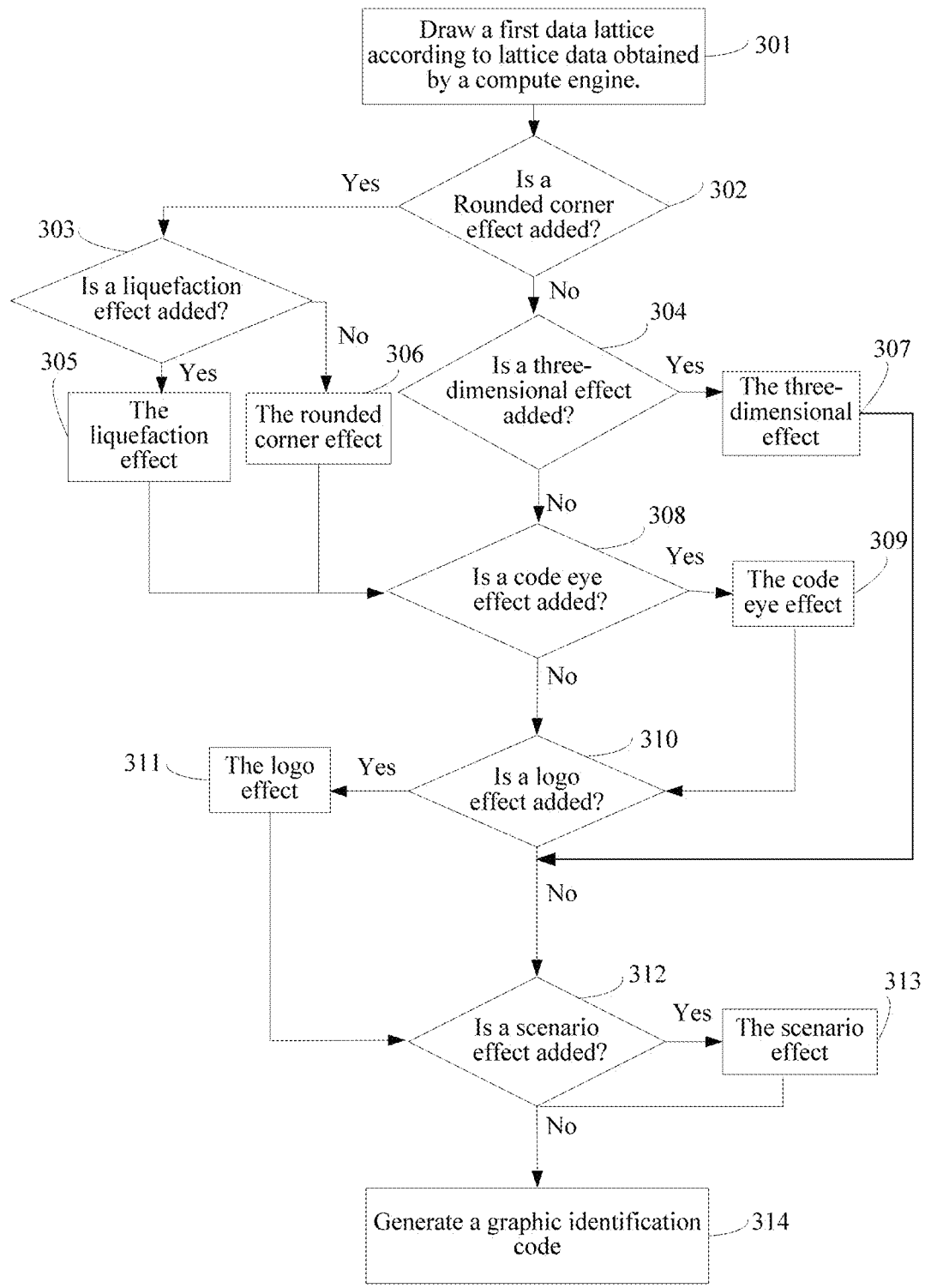
FIG. 3 is a flowchart of a graphic identification code generation method according to an embodiment of this application.

When different users generate graphic identification codes, selected personalized effect are generally different, so that effect drawing algorithms used during generation of the graphic identification codes are different. In this embodiment of this application, a rendering engine in the graphic identification code generation server may determine whether to add a particular personalized effect to a current to-be-generated graphic identification code according to the following process, and if yes, an addition operation is performed. Referring to FIG. 3, a specific process is as follows:

301. Draw a first data lattice according to lattice data obtained by a compute engine.

For details about how to draw the first data lattice according to the lattice data, refer to step 202.

302. Determine whether to add a rounded corner effect according to personalized effect information; and if yes, perform step 303; or if no, perform step 304.

303. Determine whether to add a liquefaction effect according to the personalized effect information; and if yes, perform step 305; or if no, perform step 306.

304. Determine whether to add a three-dimensional effect according to the personalized effect information; and if yes, perform step 307; or if no, perform step 308.

305. Perform liquefaction effect processing on the first lattice data, to obtain processed first lattice data, and perform step 308 after the liquefaction effect is completed.

For a specific process of adding the liquefaction effect, refer to step 202.

306. Perform rounded corner effect processing on the first lattice data, to obtain processed first lattice data, and perform step 308 after the rounded corner effect is completed.

For a specific process of adding the rounded corner effect, refer to step 202.

307. Perform three-dimensional effect processing on the first lattice data, to obtain processed first lattice data, and perform step 312 after the three-dimensional effect is completed.

For a specific process of adding the three-dimensional effect, refer to step 202.

308. Determine whether to add a code eye effect according to the personalized effect information; and if yes, perform step 309; or if no, perform step 310.

309. Perform code eye effect processing on the first lattice data, to obtain processed first lattice data, and perform step 310 after the code eye effect is completed.

For a specific process of adding the code eye effect, refer to step 202.

310. Determine whether to add a logo effect according to the personalized effect information; and if yes, perform step 311; or if no, perform step 312.

311. Perform logo effect processing on the first lattice data, to obtain processed first lattice data, and perform step 312 after the logo effect is completed.

For a specific process of adding the logo effect, refer to step 202.

312. Determine whether to add a scenario effect according to the personalized effect information; and if yes, perform step 313; or if no, perform step 314.

314. Generate a graphic identification code.

According to the method provided in this embodiment of the disclosure, after receiving the target information and the personalized effect information of the graphic identification code that are obtained by displaying the basic effect setting option and the personalized effect setting option by the terminal, the lattice data of the graphic identification code is generated according to the target information, and processing is further performed on the lattice data according to the personalized effect information, to generate the graphic identification code having the personalized effect such as the rounded corner effect, the liquefaction effect, or the three-dimensional effect. Because the graphic identification code having the personalized effect such as the rounded corner effect, the liquefaction effect, or the three-dimensional effect may be automatically generated without manual making of a designer, the efficiency for generating the graphic identification code is greatly improved, more scenario requirements are satisfied, a audience range is relatively large, and the flexibility is relatively high.

Figure 4:
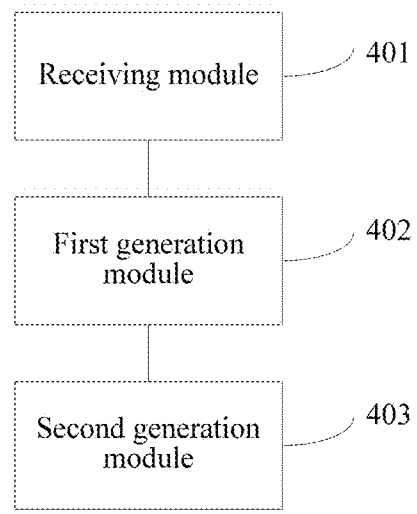
FIG. 4 is a schematic structural diagram of a graphic identification code generation apparatus according to an embodiment of this application.

FIG. 4 is a schematic structural diagram of a graphic identification code generation apparatus according to an embodiment of this application. Referring to FIG. 4, the apparatus provided in this embodiment of this application includes a receiving module 401, a first generation module 402, and a second generation module 403.

The receiving module 401 is configured to perform a process of receiving the target information and the personalized effect information of the graphic identification code that are sent by the terminal shown in step 201.

The first generation module 402 is configured to perform a process of generating the lattice data according to the target information shown in step 202.

The second generation module 403 is configured to perform a process of generating the graphic identification code by processing the lattice data according to the personalized effect information shown in step 202.

In another embodiment, the second generation module 403 includes:

a generation unit 4031, configured to perform a process of generating the first data lattice according to the target information shown in step 202a;

a determining unit 4032, configured to perform a process of determining the drawing algorithm according to the first-type effect information in the personalized effect information shown in step 202b;

a fill unit 4033, configured to perform a process of generating the second data lattice by performing color filling on the first data lattice according to the determined drawing algorithm shown in step 202c; and a processing unit 4034, configured to perform a process of generating the graphic identification code by performing the second data lattice according to the second-type effect information in the personalized effect information in step 202d.

In another embodiment, the fill unit 4033 is configured to perform a process of generating the second data lattice by performing color filling on the data point in the first data lattice by invoking the liquefaction effect drawing algorithm in step 202c.

In another embodiment, the fill unit 4033 is configured to perform a process of determining the to-be-filled color of the current to-be-filled square in step 202c.

In another embodiment, the fill unit 4033 is configured to perform a process of generating the second data lattice by performing color filling on the data point in the first data lattice by invoking the three-dimensional effect drawing algorithm in step 202c.

In another embodiment, the fill unit 4033 is configured to perform a process of determining the to-be-filled color of the current to-be-filled parallelogram in step 202c.

In another embodiment, the fill unit 4033 is configured to perform a process of generating the second data lattice by performing color filling on the data point in the first data lattice by invoking the rounded corner effect drawing algorithm in step 202c.

In another embodiment, the processing unit 4034 is configured to perform a process of adding the code eye to the second data lattice shown in step 202d.

In another embodiment, the processing unit 4034 is configured to perform a process of adding another effect to the second data lattice shown in step 202d.

In another embodiment, the apparatus further includes an uploading module 404 and a sending module 405.

The uploading module 404 is configured to perform a process of uploading the graphic identification code to the CDN server shown in step 203.

The sending module 405 is configured to perform a process of sending the CDN address to the terminal shown in step 203.

According to the apparatus provided in this embodiment of this application, after receiving the target information and the personalized effect information of the graphic identification code that are obtained by displaying the basic effect setting option and the personalized effect setting option by the terminal, the lattice data of the graphic identification code is generated according to the target information, and processing is further performed on the lattice data according to the personalized effect information, to generate the graphic identification code having the personalized effect such as the rounded corner effect, the liquefaction effect, or the three-dimensional effect. Because the graphic identification code having the personalized effect such as the rounded corner effect, the liquefaction effect, or the three-dimensional effect may be automatically generated without manual making of a designer, the efficiency for generating the graphic identification code is greatly improved, more scenario requirements are satisfied, an audience range is relatively large, and the flexibility is relatively high.

It should be noted that when the graphic identification code generation apparatus provided in the foregoing embodiment generates the graphic identification code, the foregoing division of the functional modules is merely an example for description. In actual application, the foregoing functions may be allocated to and completed by different functional modules as required, that is, the inner structure of the apparatus is divided into different functional modules, so as to complete all or some of the functions described above. In addition, the graphic identification code generation apparatus provided in the foregoing embodiment and the graphic identification code generation method embodiment belong to a same concept. For a specific implementation process, refer to the method embodiment, and details are not described herein again.

Figure 5:
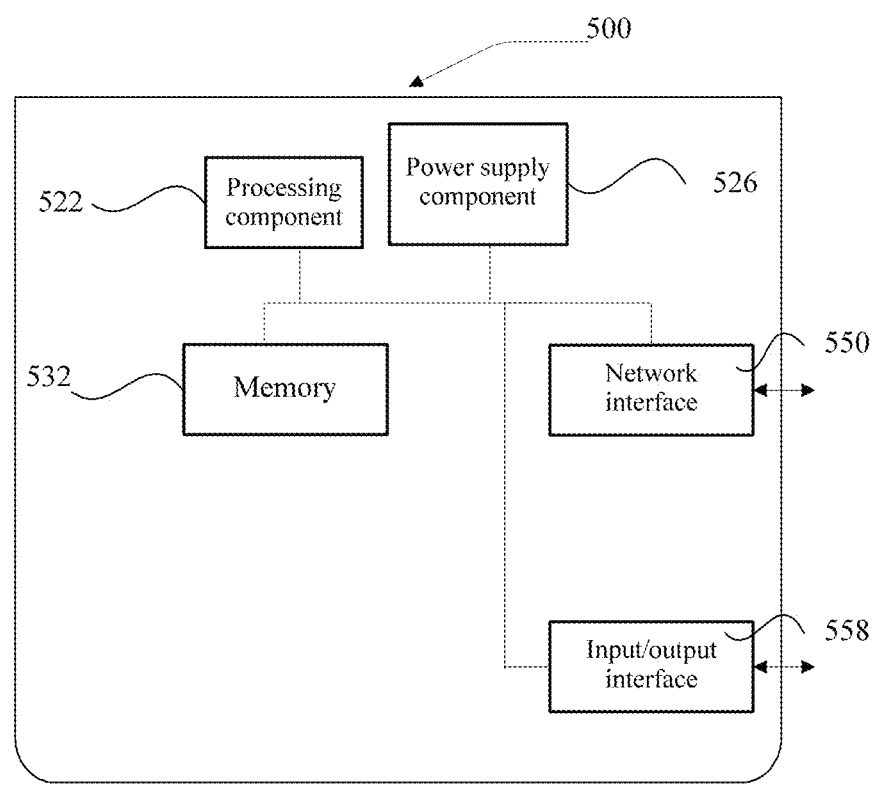
FIG. 5 is a schematic structural diagram of a graphic identification code generation apparatus according to an embodiment of this application.

FIG. 5 is a schematic structural diagram of a graphic identification code generation apparatus 500 according to an embodiment of this application. For example, the apparatus 500 may be provided as a server. Referring to FIG. 5, the apparatus 500 includes a processing component 522, and the processing component 522 further includes one or more processors, and a memory resource represented by a memory 532, the memory resource being used for storing instructions, for example, an application program, that can be executed by the processing component 522. The application program stored in the memory 532 may include one or more modules each of which corresponds to a set of instructions. In addition, the processing component 522 is configured to execute the instructions, so as to perform the graphic identification code generation method.

The apparatus 500 may further include a power supply component 526 configured to perform power supply management of the apparatus 500, a wired or wireless network interface 550 configured to connect the apparatus 500 to a network, and an input/output (I/O) interface 558. The apparatus 500 may operate an operating system, for example, Windows Server™, Mac OS X™, Unix™, Linux™, or FreeBSD™, that is stored in the memory 532.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely illustrative embodiments of this application, but are not intended to limit this application. Any modification, equivalent replacement, or improvement made within the spirit and principle of this application shall fall within the protection scope of this application and the appended claims.

What is claimed is:

1. A method comprising:
receiving, by at least one processor from a terminal, target information to be coded in a graphic identification code, and personalized effect information;
generating, by the at least one processor, first lattice data according to the target information;
processing, by the at least one processor, each data point in the first lattice data according to first-type effect information included in the personalized effect information, to obtain second lattice data which has a different personalized effect from the first lattice data; and
processing, by the at least one processor, the second lattice data according to second-type effect information included in the personalized effect information, to obtain the graphic identification code,
wherein the first-type effect information comprises liquefaction effect information, three-dimensional effect information, or rounded corner effect information, and the second-type effect information comprises effect information other than the first-type effect information,
when the first-type effect information is liquefaction effect information, the processing each data point comprises dividing the data point into a plurality of squares having a same size, performing, according to a value of the data point, color filling on each of the plurality of squares, and superposing a rounded corner square with a filled color on the data point, a length of a side of the rounded corner square being the same as a length of a side of the data point, and the filled color of the rounded corner square set according to the value of the data point,
when the first-type effect information is three-dimensional effect information, the processing each data point comprises determining whether the data point is to be filled with a background color, according to the value of the data point, filling the data point with the background color if the data point is to be filled with the background color, drawing at least one parallelogram based on an outline of the data point, performing color filling on each of the at least one parallelogram, according to the value of the data point, determining whether the data point is to be filled with a foreground color, according to the value of the data point, and filling the data point with the foreground color if the data point is to be filled with the foreground color, the foreground color being indicated by a foreground color identifier included in the personalized effect information and the background color being indicated by a background color identifier included in the personalized effect information, and
when the first-type effect information is rounded corner effect information, the processing each data point comprises changing a shape of the data point from a square to a circle, in response to the value of the data point being a first value, filling the circle-shaped data point with a foreground color indicated by a foreground color identifier included in the personalized effect information, and in response to the value of the data point being a second value, filling the circle-shaped data point with a background color indicated by a background color identifier included in the personalized effect information.

2. The method according to claim 1, wherein the first-type effect information is liquefaction effect information, and wherein the performing color filling comprises:
in response to the value of the data point being the first value and all values of other data points connected to a current to-be-filled square being the second value, filling the current to-be-filled square with the background color; or
in response to the value of the data point being the first value and the current to-be-filled square not being connected to other data points, filling the current to-be-filled square with the background color; or
in response to the value of the data point being the second value and all values of other data points adjacent to the current to-be-filled square being the first value, filling the current to-be-filled square with the foreground color,
the foreground color being indicated by the foreground color identifier included in the personalized effect information and the background color being indicated by the background color identifier included in the personalized effect information.

3. The method according to claim 1, wherein the first-type effect information is three-dimensional effect information, and
wherein the performing color filling comprises:
in response to the value of the data point being the first value and all values of other data points adjacent to a current to-be-filled parallelogram are the second value, filling the current to-be-filled parallelogram with another color other than the foreground color and the background color.

4. The method according to claim 1, wherein the first-type effect information is three-dimensional effect information, and
wherein the performing color filling comprises:
in response to the value of the data point being the first value and a current to-be-filled parallelogram not being adjacent to other data points, filling the current to-be-filled parallelogram with another color other than the foreground color and the background color.

5. The method according to claim 1, wherein the first-type effect information is three-dimensional effect information, and
wherein the performing color filling comprises:
in response to the value of the data point being the second value and all values of other data points adjacent to a current to-be-filled parallelogram being the first value, filling the current to-be-filled parallelogram with another color other than the foreground color and the background color.

6. The method according to claim 1, wherein the processing the second data lattice comprises:
in response to the second-type effect information being code eye information, determining a code eye type indicated by the code eye information;
obtaining a code eye image and first location information according to the code eye type;
performing horizontally flipping, vertically flipping, and diagonally flipping on the code eye image in response to the code eye image being a non-axially symmetric image, to obtain a first flipped image, a second flipped image, and a third flipped image, respectively; and adding a code eye in the second data lattice at a vertex angle location indicated by the first location information, based on the code eye image, the first flipped image, the second flipped image, and the third flipped image, to obtain the graphic identification code.

7. The method according to claim 1, wherein the processing the second data lattice comprises:

in response to the second-type effect information being logo information, obtaining a logo and second location information, and adding the logo in the second data lattice at a location indicated by the second location information, to obtain the graphic identification code.

8. The method according to claim 1, wherein the processing the second data lattice comprises:

in response to the second-type effect information being size information, performing scaling processing on the second data lattice according to the size information, to obtain the graphic identification code.

9. The method according to claim 1, wherein the processing the second data lattice comprises:

in response to the second-type effect information being format information, storing the second data lattice as an image format indicated by the format information, to obtain the graphic identification code.

10. The method according to claim 1, wherein the processing the second data lattice comprises:

in response to the second-type effect information being boundary information, adding a boundary box for the second data lattice according to the boundary information, to obtain the graphic identification code.

11. The method according to claim 1, wherein the processing the second data lattice comprises:

in response to the second-type effect information being scenario information, obtaining a scenario image and third location information, and embedding the second data lattice in the scenario image at a location indicated by the third location information, to obtain the graphic identification code.

12. The method according to claim 1, further comprising:

uploading the graphic identification code to a content delivery network (CDN) server; and receiving, from the CDN server, a CDN address of the graphic identification code.

13. The method of claim 1, wherein each of the first lattice data and the second lattice data is a bit stream.

14. An apparatus comprising:

at least one memory configured to store computer program code; and at least one processor configured to access the at least one memory and operate according to the computer program code, the computer program code including:

receiving code configured to cause the at least one processor to receive, from a terminal, target information to be coded in a graphic identification code, and personalized effect information;

first lattice generation code configured to cause the at least one processor to generate first lattice data according to the target information; and first processing code configured to cause the at least one processor to process each data point in the first lattice data according to first-type effect information included in the personalized effect information, to obtain second lattice data which has a first different personalized effect from the first lattice data; and graphic generation code configured to cause the at least one processor to process the second lattice data according to second-type effect information included in the personalized effect information, to obtain the graphic identification code, wherein the first-type effect information comprises liquefaction effect information, three-dimensional effect information, or rounded corner effect information, the second-type effect information comprises effect information other than the first-type effect information, and when the first-type effect information is liquefaction effect information, the first processing code is configured to cause the at least one processor to divide the data point into a plurality of squares having a same size, perform, according to a value of the data point, color filling on each of the plurality of squares, and superpose a rounded corner square with a filled color on the data point, a length of a side of the rounded corner square being the same as a length of a side of the data point, and the filled color of the rounded corner square set according to the value of the data point, when the first-type effect information is three-dimensional effect information, the first processing code is configured to cause the at least one processor to determine whether the data point is to be filled with a background color, according to the value of the data point, fill the data point with the background color if the data point is to be filled with the background color, draw at least one parallelogram based on an outline of the data point, perform color filling on each of the at least one parallelogram, according to the value of the data point, determine whether the data point is to be filled with a foreground color, according to the value of the data point, and fill the data point with the foreground color if the data point is to be filled with the foreground color, the foreground color being indicated by a foreground color identifier included in the personalized effect information and the background color being indicated by a background color identifier included in the personalized effect information, and when the first-type effect information is rounded corner effect information, the first processing code is configured to cause the at least one processor to change a shape of the data point from a square to a circle, in response to the value of the data point being a first value, fill the circle-shaped data point with a foreground color indicated by a foreground color identifier included in the personalized effect information, and in response to the value of the data point being a second value, fill the circle-shaped data point with a background color indicated by a background color identifier included in the personalized effect information.

15. A non-transitory computer readable medium storing computer program code which, when executed by at least one processor, performs:

receiving, from a terminal, target information to be coded in a graphic identification code, and personalized effect information;

generating first lattice data according to the target information;

processing each data point in the first lattice data according to first-type effect information included in the personalized effect information, to obtain second lattice data which has a different personalized effect from the first lattice data; and processing the second lattice data according to second-type effect information included in the personalized effect information, to obtain the graphic identification code, wherein the first-type effect information comprises liquefaction effect information, three-dimensional effect information, or rounded corner effect information, and the second-type effect information comprises effect information other than the first-type effect information, when the first-type effect information is liquefaction effect information, the processing each data point comprises dividing the data point into a plurality of squares having a same size, performing, according to a value of the data point, color filling on each of the plurality of squares, and superposing a rounded corner square with a filled color on the data point, a length of a side of the rounded corner square being the same as a length of a side of the data point, and the filled color of the rounded corner square set according to the value of the data point, when the first-type effect information is three-dimensional effect information, the processing each data point comprises determining whether the data point is to be filled with a background color, according to the value of the data point, filling the data point with the background color if the data point is to be filled with the background color, drawing at least one parallelogram based on an outline of the data point, performing color filling on each of the at least one parallelogram, according to the value of the data point, determining whether the data point is to be filled with a foreground color, according to the value of the data point, and filling the data point with the foreground color if the data point is to be filled with the foreground color, the foreground color being indicated by a foreground color identifier included in the personalized effect information and the background color being indicated by a background color identifier included in the personalized effect information, and when the first-type effect information is rounded corner effect information, the processing each data point comprises changing a shape of the data point from a square to a circle, in response to the value of the data point being a first value, filling the circle-shaped data point with a foreground color indicated by a foreground color identifier included in the personalized effect information, and in response to the value of the data point being a second value, filling the circle-shaped data point with a background color indicated by a background color identifier included in the personalized effect information.

* * * * *